US008010904B2

(12) United States Patent
Prabhu

(10) Patent No.: US 8,010,904 B2
(45) Date of Patent: Aug. 30, 2011

(54) CUSTOMIZABLE LAYOUT OF SEARCH RESULTS

(75) Inventor: Raghavendra Prabhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 11/725,724

(22) Filed: Mar. 20, 2007

(65) Prior Publication Data

US 2008/0235608 A1  Sep. 25, 2008

(51) Int. Cl.
G06F 3/048 (2006.01)
G06F 15/00 (2006.01)
(52) U.S. Cl. ......... 715/765; 715/744
(58) Field of Classification Search .......... 715/243, 715/765
See application file for complete search history.

(56) References Cited

U.S. PATENT DOCUMENTS

| | | | | |
|---|---|---|---|---|
| 6,434,556 | B1 * | 8/2002 | Levin et al. | 707/5 |
| 6,990,633 | B1 * | 1/2006 | Miyasaka et al. | 715/201 |
| 7,117,452 | B1 * | 10/2006 | Pavelski et al. | 715/792 |
| 7,574,669 | B1 * | 8/2009 | Braun et al. | 715/777 |
| 2003/0079177 | A1 * | 4/2003 | Brintzenhofe et al. | 715/500 |
| 2005/0198584 | A1 * | 9/2005 | Matthews et al. | 715/779 |
| 2005/0289133 | A1 * | 12/2005 | Arrouye et al. | 707/4 |
| 2006/0074883 | A1 * | 4/2006 | Teevan et al. | 707/3 |
| 2007/0233692 | A1 * | 10/2007 | Lisa et al. | 707/10 |
| 2007/0288431 | A1 * | 12/2007 | Reitter et al. | 707/3 |
| 2008/0172362 | A1 * | 7/2008 | Shacham et al. | 707/3 |
| 2008/0189645 | A1 * | 8/2008 | Kapanen et al. | 715/777 |
| 2010/0106595 | A1 * | 4/2010 | Baugher | 705/14.42 |

* cited by examiner

Primary Examiner — Stephen Hong
Assistant Examiner — Ahamed Nazar

(57) ABSTRACT

Customizable layout of search results techniques are described. In an implementation, a user interface to display search results is provided having one or more portions that are user selectable to customize a layout of search results from a search service. When one or more of the portions are selected, the layout is customized by corresponding rearrangement of obtained search results locally at a client. One or more preferences that describe the layout specified by the user may be stored based on the user's interaction with the user interface. When the user performs a search via the search service, the results of the search are presented in accordance with the layout specified by the user.

18 Claims, 8 Drawing Sheets

CUSTOMIZABLE LAYOUT OF SEARCH RESULTS

BACKGROUND

A vast amount of content is available to users over a network, and the amount is ever increasing. For example, users currently have access to billions of web pages via the Internet. Further, users are exposed to ever increasing types of content, from web pages to images to downloadable music and so on. Therefore, it may be difficult for the users to locate particular content of interest from this amount and types of content.

One technique that may be utilized to locate desired content is through the use of an Internet search engine, also commonly known as a "search engine". A traditional search engine is typically accessed via a particular web site address and works as a stand-alone program that maintains a database of information collected over the Internet. For example, the user of a client may execute a browser to navigate to the traditional search engine. The user may then enter search terms and the traditional search engine may respond by returning pages of search results that are displayable by the browser. Typically, the search results are provided in a predetermined format that is fixed by a provider of the search engine. Therefore, users are given little to no control to modify how the page is presented, such as a layout and arrangement search results within the page. Thus, users of traditional search engines may be limited to viewing search results as fixed by the provider which may not match the preferences of the users and, therefore, diminishes the users' experience with the search engine.

SUMMARY

Techniques are described to provide a customizable layout of search results. In an implementation, a user interface is provided to display search results from a search service. The user interface having one or more portions that are user selectable to customize a layout of the search results may be output at a client. When one or more of the portions are selected, the layout is customized by corresponding rearrangement of obtained search results locally at the client. One or more preferences are stored that describe the layout specified by the user based on the user's interaction with the user interface. Accordingly, when the user performs a search via the search service, the results of the search are presented in accordance with the layout specified by the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

To locate content over the Internet, a user typically interacts with search services (e.g., search engines), such as through use of a browser to navigate to a particular network address. However, search results from traditional search engines are typically presented in a layout that is fixed by the service provider. Thus, the user of the traditional search engine is not given control regarding layout and arrangement of the search results.

Techniques are described in which a layout of search results may be customized by a user. In an implementation, a user may interact with a user interface at a client to specify preferences regarding layout of search results obtained from a search service. The user, for instance, may specify layout of results in terms of linear versus multi-column, paginated or "infinite" scroll, choose from a variety of scopes (e.g., web, news, and images) to be displayed side by side on a single page or on separate pages, and so on. Displayed search results may be updated in response to the user's interactions by corresponding rearrangement of the obtained search results locally at the client. Preferences may also be stored, such as with an account of the user. Therefore, when the user performs a search via the search service, the results of the search are presented in accordance with the layout specified by the user's corresponding preferences.

In another implementation, these preferences may be exported for use by another user. For example, a search service may provide functionality to export preferences associated with a user via a theme file, which may be generated in an extensible mark-up language (XML), or other mark-up language, protocol, and/or format suitable for sharing a set of user preferences. The user may then share or publish these preferences by providing the theme file to another user, uploading the theme file to a public or shared location (e.g., a theme site), and so on. The exported theme file may then be associated with another user, such that when the other user performs a search via the search service, the results of the search are presented in accordance with the layout specified by exported theme file. Further discussion of preference exporting may be found in relation to FIG. 5.

In the following discussion, an exemplary environment is first described that is operable to employ techniques to customize a layout of search results. Exemplary procedures are then described which may be employed by the exemplary environment, as well as in other environments.

Exemplary Environment

Figure 1:
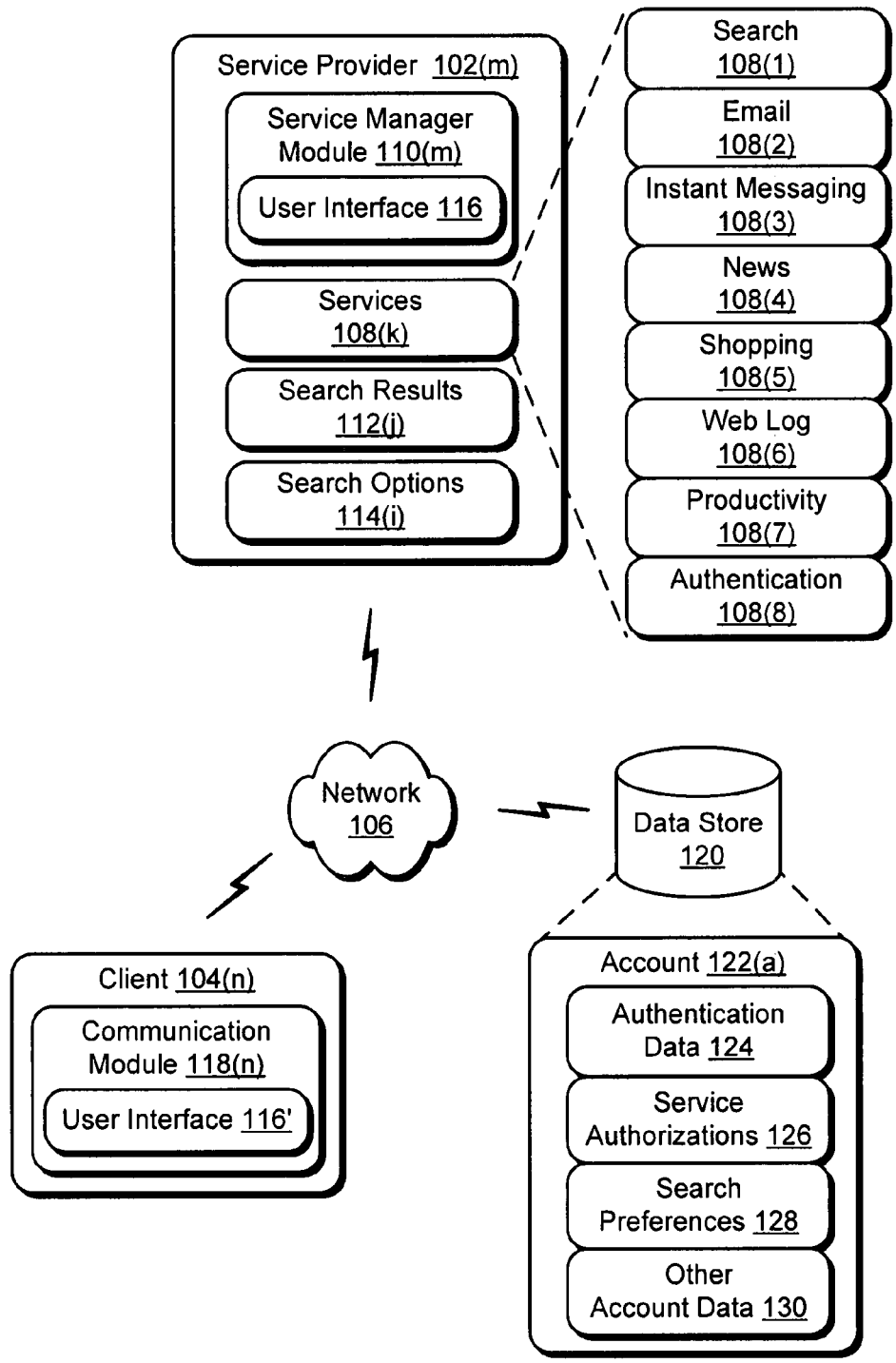
FIG. 1 is an illustration of an environment in an exemplary implementation that is operable to provide customizable layout of search results.

FIG. 1 is an illustration of an environment 100 in an exemplary implementation that is operable to customize a layout of search results. The illustrated environment 100 includes one or more service providers 102(m) (where "m" can be any integer from one to "M") and one or more clients 104(n) (where "n" can be any integer from one to "N") that are communicatively coupled, one to another, over a network 106. For purposes to the following discussion, the service provider 102(m) and the client 104(n) may be representative of a single entity or a plurality of entities and therefore reference may be made in singular or plural form, such as the "client 104(n)", the "clients 104(n)", the "plurality of clients 104(n)", and so on.

The clients 104(n) may be configured in a variety of ways for accessing the service providers 102(m). For example, one or more of the clients 104(n) may be configured as a computer, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory, processing and/or display resources (e.g., traditional set-top boxes, hand-held game consoles, wireless phones). For purposes of the following discussion, the clients 104(n) may also relate to a person and/or entity that operate the clients. In other words, one or more of the clients 104(n) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The service providers 102(m) are each illustrated as providing one or more services 108(k) (where "k" can be any integer from one to "K") that are accessible via the network 106. The services 108(k) may be configured in a variety of ways to provide functionality over the network 106 to the clients 104(n). For example, the services 108(k) may be configured for access via platform-independent protocols and standards to exchange data over the network 106. The services 108(k), for instance, may be provided via an Internet-hosted module that is accessed via standardized network protocols, such as a simple object access protocol (SOAP) over hypertext transfer protocol (HTTP), extensible markup language (XML), and so on, further discussion of which may be found in relation to FIG. 2.

A variety of functionality may be made available via the plurality of services 108(k). For example, as depicted in FIG. 1 services 108(k) may include but are not limited to a search 108(1) service (e.g., an Internet search engine to search the Internet), an email 108(2) service to send and receive email, and an instant messaging 108(3) service to provide instant messaging between the clients 104(n). Additional examples include a news 108(4) service, a shopping (e.g., "ecommerce") 108(5) service, and a web log 108(6) service. Further, productivity 108(7) services may also be provided, such as word processing, spreadsheets, presentations, drawings, note-taking, and so on. For instance, network access may be given to the client 104(n) to applications that were traditionally executed locally on the client 104(n) itself. Therefore, execution of the applications may be performed remotely at the service provider 102(m) and results of the execution may be communicated over the network 106 to the clients 104(n) or a particular one of the clients 104(n). An authentication service 108(8) may also be provided to authenticate clients 104(n) to access other services 108(k), which may include services 108(k) provided by one or more of the plurality of service providers 102(m). Although a few examples of services 108(k) have been described, it should be apparent that a wide variety of other services 108(k) are also contemplated.

The service providers 102(m) are also illustrated as having respective service manager modules 110(m). The service manager modules 110(m) are representative of functionality used by the service providers 102(m) to manage access to the services 108(k) over the network 106, performance of the services 108(k) (e.g., load balancing), and so on. Although illustrated separately, the functionality represented by the service manager modules 10(m) may be incorporated within the services 108(k) themselves.

For example, one or more of the service providers 102(m) via respective service manager modules 110(m) may provide a search 108(1) service to the clients 104(n) via the network 106. Search 108(1) service represents functionality accessible by the clients 104(n) to perform a variety of searches which may include but are not limited to searching: the Internet, web, an intranet, or other network 106; a desktop of one or more of the clients 104(n); a user account; a specified domain; a collection of sites; and so forth. Thus, the search 108(1) service may be representative of one or more search engines that provide functionality to search for results in corresponding search scopes. A search scope corresponding to a search engine refers to the location(s) in which the search engine is configured to conduct the search such as designated sites, domains, devices, accounts, and so forth. Examples of search scopes include but are not limited to web, images, news, contacts email, classifieds, instant messaging, maps, desktop and so forth. The search 108(1) service may even incorporate a custom search engine or macro to search a user-defined-search scope; such as a web log of users, a community forum, a collection of business sites, a hobby, and so forth.

In operation, service manager modules 110(m) may be executed to generate and/or provide one or more search results 112(j) (where "j" can be any integer from one to "J") in response to interactions of the clients 104(n) with the service providers 102(m) and/or search 108(1) service. Further, service providers 102(m) may provide functionality to the clients 104(n) to select a variety of user configurable search options 114(i) (where "i" can be any integer from one to "I") to specify a customized layout of search results 112(j). Layout as used herein may refer not only to the content included in the search results 112(j), but also to the arrangement of those search results 112(j), one to another, further discussion of which may be found in relation to FIG. 2.

Further, the service manager modules 110(m) may be utilized to form and/or output a user interface 116 or data sufficient to form the user interface 116 that is provided over the network 106 to the client 104(n) to enable the client 104(n) to interact with the services 108(k). Such interactions may include interaction with the search 108(1) service to perform searches, obtain search results 112(j), specify custom layouts for the search results 112(j), and so forth. Thus, service manager modules 110(m) may output the user interface 116 having search results 112(j), and more particularly may provide data used to form the user interface 116. The data used to form the user interface 116 may be communicated via the network 106 to the client 104(n).

Clients 104(n) are depicted as including respective communication modules 118(n) through which interactions with the search 108(1) service and service providers 102(m) may occur. The communication module 118(n) represents functionality that is executable to obtain the user interface 116 or data resulting from a search performed via one of the service providers 102(m) and render the data as a user interface 116' at the client 104 to display the search results 112(j). Further, the search results 112(j) may be arranged in accordance with a customized layout specified by selected search options 114(i).

Additionally, the environment 100 is illustrated as including a data store 120 which may represent functionality to maintain one or more accounts 122(a) (where "a" can be any integer from one to "A"), each corresponding to the clients 104(n), such as by corresponding to the device itself and/or a user that interacts with the device. Thus, each of the accounts 122(a) may include data that is utilized for interaction by a respective one of the clients 104(n) or a user with the service providers 102(m) and/or the plurality of service 108(k). For example, the accounts 122(a) may correspond to a particular client 104(n) and include authentication data 124 (e.g., username and password or other suitable credentials) used to authenticate the client's 104(n) identity (e.g., prove that a client 104(n) or user "is who they say they are"). Accounts 122(a) may also include service authorizations 126 which indicate which of the service providers 102(m) and/or services 108(k) that is permitted to interact with the client 104(n). In addition, search preferences 128 may be included that describe a customized layout for search results 112(j) from a search 108(1) service, as well as other search preferences. A wide variety of other account data 130 is also contemplated, such as user profile data, contacts, personalized emoticons or user tiles, audio files, and so on.

Each of the accounts 122(a) may correspond to a particular one of the service providers 102(m) and/or services 108(k). Thus, authentication to one of the accounts 122(a) may provide access to a single corresponding service provider 102(m) and/or service 108(k). Additionally or alternatively, one or more of the accounts 122(a) may correspond to many services 108(k), such that authentication to a single one of the accounts 122(a) may provide access to many service providers 102(m) and/or to an entire suite of services 108(k) provided by a single service provider 102(m). Thus, rather than have the client 104(n) be authenticated to each of the service providers 102(m) or services 108(k) separately, the client 104(n) may perform a "single sign-on" (e.g., perform a single verification of credentials) to access a plurality of services 108(k) from one or more of the service providers 102(m).

The accounts 122(a) maintained via the data store 120 may be accessible to the clients 104(m) and/or service providers 102(m) via the network 106. For instance, the data store 120 may be accessible via the network 106 to reference the accounts 122(a) including the search preferences 128. Thus, when a search is initiated by a client 104(n) (e.g., a user) using an account 122(a) authenticated to interact with a search 108(1) service, a corresponding service manager module 110(m) may operate to obtain stored search preferences 128 corresponding to the authenticated account 122(a). Thus, a user interface 116 which is output to present the results of the search may be arranged in accordance with a customized layout specified by the stored search preferences 128.

While illustrated separately, the data store 120 may be incorporated with the service providers 102(m) or with the clients 104(n). In an implementation, the data store 120 is provided via a standalone authentication service that is further described in reference to FIG. 2. Further discussion of functionality that may be provided by search providers 102(m) to specify a customized layout of search results 112(j) may be found in the discussion of the subsequent figures.

While the search preferences 128 are depicted in FIG. 1 as being included with the accounts 122(a), it is contemplated that the search preferences 128, and/or other data depicted as associated with the accounts 122(a), may be provided in a variety of ways throughout the environment 100: In an embodiment, search preferences 128 may be maintained in a user preferences store or database which is separate from the accounts 122(a). For example, a user preference store having the search preferences 128 may be located at the service provider 102(m) and/or at one or more of the clients 104(n), while the accounts 122(a) are located at a stand-alone authentication service 108(8) configured to perform authentication functions. Thus, the data store 120 may be representative of a plurality of data stores accessible via the network 106 which are not necessarily co-located.

Additionally, the search preferences 128 may be accessible without an associated client 104(n) being authenticated to an account 122(a). For instance, a cookie or other suitable data describing search preferences 128 corresponding to a client 104(n) may be deployed to the client 104(n) and/or otherwise be associated with the client 104(n). Then, when the client 104(n) interacts with the search 108(1) service, the cookie or other data may be referenced to retrieve associated search preferences 128 without the client 104(n) having to provide credentials for authentication. Thus, search preferences 128 may be associated with a client 104(n) in addition to or in lieu of being associated with accounts 122(a). In this manner, clients 104(n) may experience customized layout of search results even without authentication to an associated account 122(a).

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of customizable layout of search results techniques described below are platform-independent, meaning that the techniques may be implemented on a variety of commercial computing platforms having a variety of processors.

Figure 2:
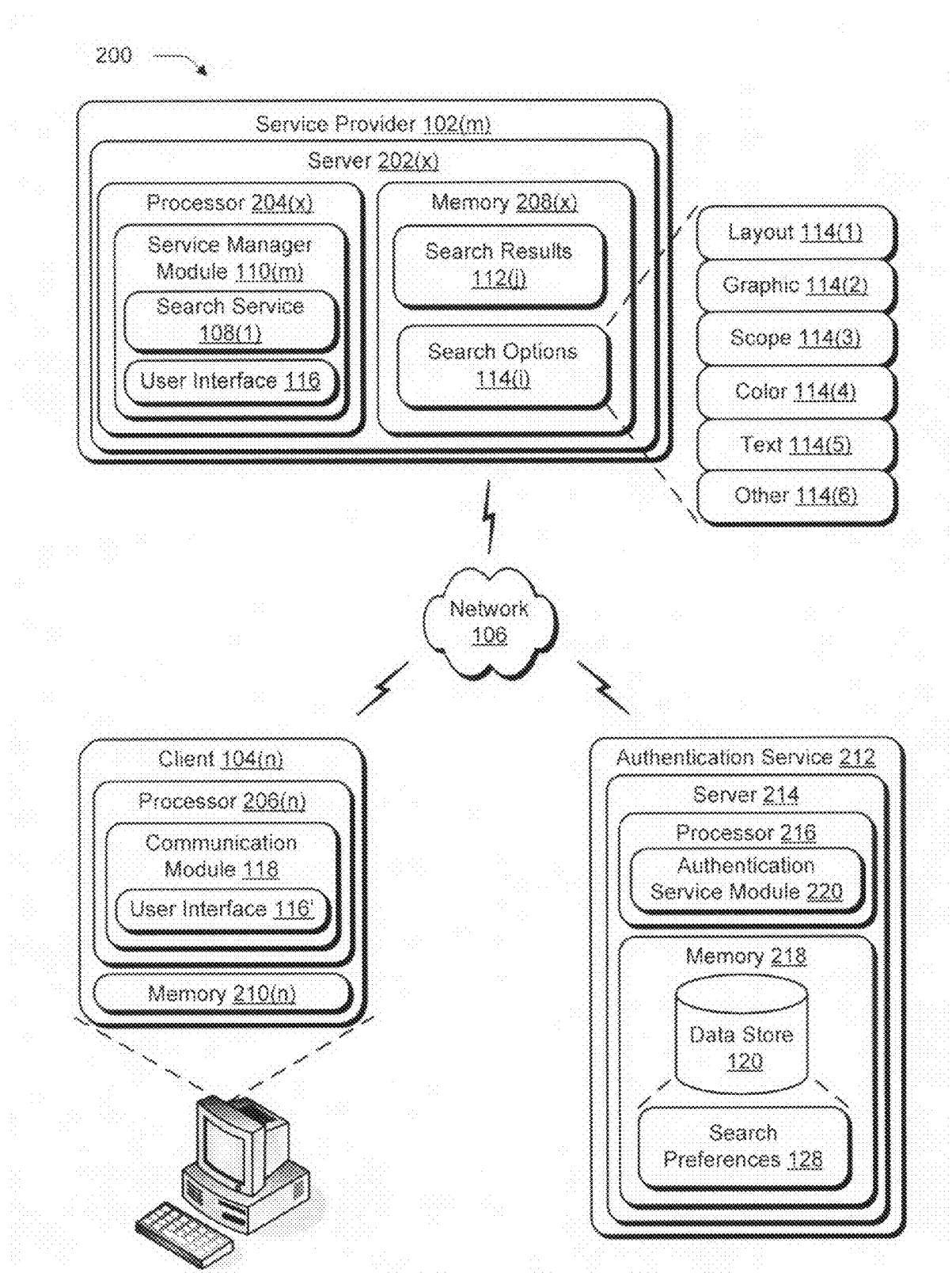
FIG. 2 is an illustration of a system in an exemplary implementation showing a service provider and client of FIG. 1 in greater detail.

FIG. 2 is an illustration of a system 200 in an exemplary implementation showing one of the service providers 102(m) and one of the clients 104(n) of FIG. 1 in greater detail. In FIG. 2, a service provider 102(m) is illustrated as being implemented by one or more servers 202(x) (where "x" can be any integer) and the client 104(n) is illustrated as a client device.

The servers 202(x) and the client 104(n) each include a respective processor 204(x), 206(n) and a respective memory 208(x), 210(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory $208(x)$, $210(n)$ is shown, respectively, for the servers $202(x)$ and the client $104(n)$, a wide variety of types and combinations of memory may be employed, such as random access memory (RAM), hard disk memory, removable medium memory, and so forth.

As previously described, the services $108(k)$ of FIG. 1 may be configured in a variety of ways to provide functionality over the network 106 to the client $104(n)$. For example, the services $108(k)$ may be provided via one or more modules which are executed on the processor $204(x)$ and are storable in memory $208(x)$. For example, the service provider $102(m)$ is illustrated in FIG. 2 as executing the service manager module $110(m)$ on the processor $204(x)$. Service manager module $110(m)$ is illustrated as providing at least the search $108(1)$ service. Naturally, the service provider $102(m)$ may also provide one or more additional services $108(k)$ as described in FIG. 1. The service manager module $110(m)$ and the search $108(1)$ service may be configured as Internet-hosted modules that are accessible via standardized network protocols. For example, the search $108(1)$ service may be configured as an Internet search module (e.g., a search engine) that examines an indexed search database to provide Internet searches. A variety of other examples are also contemplated. Search results $112(j)$, which are depicted as stored in memory $208(x)$, may represent an indexed search database that may cache results of common searches for quick access. Search results $112(j)$ may also represent results which are generated at the time a search is performed.

Additionally, a service may also be provided as a standalone service. For example, an authentication service 212 may be provided by a server 214 configured for network 106 access and that has a processor 216 and memory 218. The authentication service 212 includes an authentication service module 220 that is executable on the processor 216 to authenticate the client $104(n)$ using authentication data 124 described with respect to FIG. 1. For instance, the client $104(n)$ may provide a name and password that is authenticated by the authentication service module 220 using the authentication data 124 of FIG. 1. When the authentication is successful (i.e., the client $104(n)$ "is who they say they are"), the authentication service module 220 may pass a token to the client $104(n)$ that is used by the client $104(n)$ to access corresponding services $108(k)$ of the service provider $102(m)$. As noted in the discussion of FIG. 1, a "single sign-on" may permit the client $104(n)$ to access many service providers $102(m)$ and/or an entire suite of services $108(k)$ provided by a single service provider $102(m)$.

In this implementation, the authentication service 212 may maintain the accounts $122(a)$ and corresponding data of FIG. 1, including the search preferences 128 which may correspond to the client $104(n)$. For example, FIG. 2 depicts the data store 120 of FIG. 1 and search preferences 128 as maintained by the authentication service 212 in memory 218. Thus, the accounts $122(a)$ and search preferences 128 may be referenced from the authentication service 212 by the service provider $102(m)$ and/or client $104(n)$ via the network 106.

As previously described, the service manager module 110 $(m)$ is representative of functionality that manages interaction of the client $104(n)$ with the plurality of services $108(k)$ of FIG. 1, which may be implemented as modules executable via the servers $202(x)$ and processor $204(x)$ of FIG. 2. For instance, the service manager module $110(m)$ may provide data sufficient to form the user interface 116. This data may be communicated over the network 106 to the client $104(n)$ and used by the communication module $118(n)$ (which is illustrated as being executed on the processor $206(n)$ and is storable in memory $210(n)$) to output user interface 116'. The user interface 116' may be configured in a variety of ways to provide interaction with the service provider $102(m)$ including performance or searches and specifying customized layout.

For example, the user interface 116' may include one or more portions that are selectable to specify a variety of search options $114(i)$, including options to specify a customized layout for search results $112(j)$ from the search $108(1)$ service. In this way, the client $104(n)$ may be provided with a variety of configurable search options $114(i)$, which in FIG. 2 are illustrated as stored in memory $208(x)$ of the service provider $102(m)$. A variety of search options $114(i)$ are contemplated which may be configurable by a user to change the content, arrangement and/or appearance of search results 112 $(j)$.

For instance, search options $114(i)$ may include layout $114(1)$ options. As noted above, layout as used herein may refer not only to the content included in the search results $112(j)$, but also to the arrangement of those search results $112(j)$, one to another. For instance, the layout $114(1)$ options may specify the arrangement of one particular search result relative to another search result in a page output via the search $108(1)$ service to display the search results $112(j)$. Layout may include the arrangement within the search results $112(j)$ of text blocks, headings, titles, borders, lines, graphics, and so forth. Thus, layout $114(1)$ options may be configurable to specify a customized layout for search results $112(j)$.

The customized layout, for example, may specify content to include in the search results and arrangement of the content in a search results page; the arrangement of the search results using a single page or a plurality of pages; continuous/infinite scroll or paginated; number and positions for columns and tables; arrangement of the search results using a single column or a plurality of columns; and a plurality of search scopes to include in the search results including the order of the search scopes and arrangement of the search scopes in columns, pages or tabs. Further, for each search scope, the customized layout may specify how corresponding search results are arranged within a column, page or tab corresponding to the scope.

Further, layout $114(1)$ options may be specified for each result within the search results. For instance, each search result may include a variety of portions such as: title of the result; "snippet" of text (e.g., a directory-style output of text taken from a webpage the corresponds to the result); uniform resource locator (URL); source of the result; date; size of the result; and so forth. Layout $114(1)$ options may specify which of these result portions are included for each result and how they are to be arranged (e.g. order, position and so forth). In addition properties for each of the portions may be specified such as: font; size of the text; hyperlinked or plain; text style; color, and so forth.

Additional examples of search options $114(i)$ include, but are not limited to: graphic $114(2)$ options such as a custom images for the background, icons, controls, links, and/or user tile; scope $114(3)$ options to indicate which search scopes are included in a search; color $114(4)$ options for text, lines, background borders, and tables; text $114(5)$ options such as fonts, size, hyperlinked or normal, style (italics, bold, underline, numbered) and so forth, A variety of other $114(6)$ options are also contemplated, such as number of results per page, language, filtering and so forth. Naturally, different search options 114(i) may be specified for different portions of search results 112(j), such as for different scopes. For example, news results may show the title and source, while web results may show a URL followed by a snippet. A variety of other examples are also contemplated.

The search preferences 128 stored via the authentication service 212 may represent a user's selection of the configurable search options 114(i) via user interface 116' which may be stored persistently for subsequent use. Configurable search options 114(i) may also be set to customize the layout of a search at the time of the search and/or without persistently storing the selected options as search preferences 128. For example, in an implementation, a user may interact with one or more selectable portions exposed in a user interface 116' to select search options 114(i) for search results 112(j) obtained from a search 108(1) service which are displayed via the user interface 116'. In response to the user's interactions, a corresponding rearrangement of the search results 112(j) may occur locally at the client (e.g., without communication across the network 106 and/or without another search being performed). Thus, displayed search results 112(j) may be arranged and rearranged locally at a client 104(n) in accordance with selected search options 114(i).

A user's search preferences 128 may even be exported as a theme and shared with another user. Further discussion of functionality which may be provided to a client 104(n) to specify a customized layout of search results 112(j) may be found in the following discussion of exemplary procedures and user interfaces.

Exemplary Procedures

The following discussion describes customizable layout of search results techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
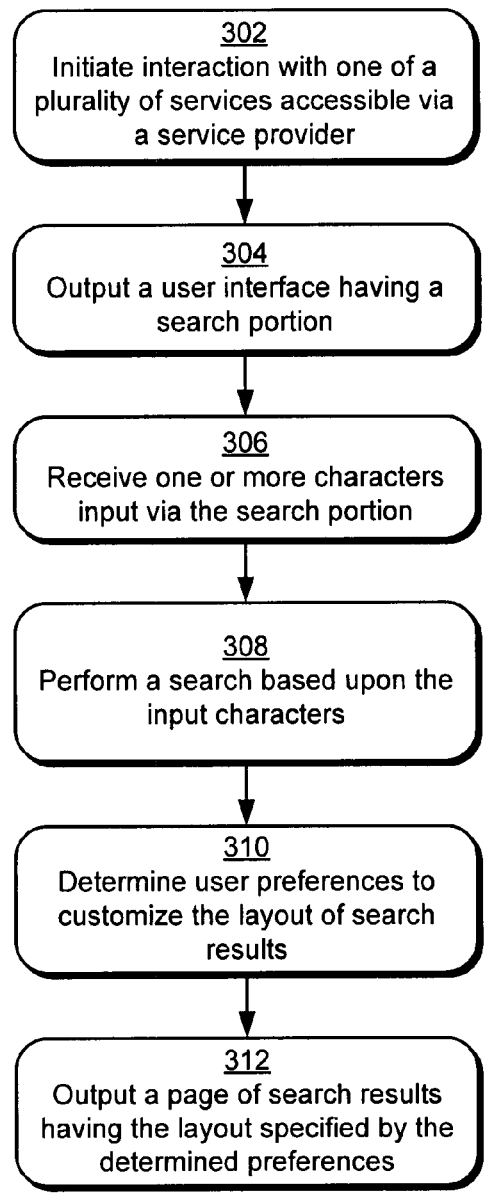
FIG. 3 is a flow diagram depicting a procedure in an exemplary implementation in which a user interacts with a user interface having one or more portions that are selectable to specify a customized layout for search results from a search service.

FIG. 3 depicts a procedure 300 in an exemplary implementation in which a user interacts with a user interface having one or more portions selectable to specify a custom layout for search results from a search service. Interaction is initiated with one of a plurality of services accessible via a service provider (block 302). For example, the client 104(n) of FIG. 2 may execute a communication module 118(n) configured as a browser and navigate over the network 106 to a network address of the service provider 102(m). The client 104(n) may also provide authentication information, such as name and password, to authenticate the client's 104(n) identity. The client 104(n) may access one or more service 108(k) based on the authentication.

A user interface is output having a search portion (block 304). In the previous example, the client 104(n) may interact with a search 108(1) service provided by the service provider 102(m) and receive data that is used to form a user interface 116 which includes a search portion. Communication module 118(n) may then output a corresponding user interface 116' at the client 104(n).

One or more characters input via the search portion are received (block 306). The client 104(n) in the above example may provide one or more characters via the search portion to specify a search. For example, to search for information on the "National Football League" the term "National Football League" or characters "N", "F", "L" may be input and communicated to the service provider 102(m). Then, a search is performed based upon the input characters (block 308). For example, the service provider 102(m) in response to input characters N", "F", "L" may execute a search 108(1) service to perform a search and/or obtain corresponding search results 112(j).

User preferences are determined to customize the layout of search results (block 310). For example, when the search for "National Football League" is performed by a client 104(n), service provider 102(m) may reference search preferences 128 corresponding to the client 104(n) to determine a customized layout of the search results 112(j). In an embodiment, the search preferences 128 are determined based upon an authenticated account 122(a) which is used to perform the search. Thus, for example, search preferences 128 associated with the authenticated account 122(a) may be referenced from a data store 120 that maintains accounts 122(a) for a plurality of clients 104(n).

In an implementation, the search preferences 128 are determined based upon selection of search options 114(i) presented via a user interface 116' output at the client 104(n). For instance, the client 104(n) of FIG. 2 may receive search results 112(j) in an initial or default layout via a user interface 116' which includes one or more portions selectable to customize the layout of the search results 112(j). The client 104(n) may then make selections of configurable search options 114(i) via the one or more portions to specify a customized layout. Selections of configurable search options 114(i) may be used for the particular search without saving, or may be saved as stored search preferences 128. In an implementation, the selection of configurable search options 114(i) causes a corresponding rearrangement of search results 112 (j) already obtained by a client 104(n) locally at the client 104(n) and without an additional search being performed over the network 106.

A page of search results is output having the layout specified by the determined preferences (block 312). For example, search preferences 128 determined in response to the search for "National Football League" may specify a plurality of scopes to search, such as web, news and images. The search preferences 128 may further indicate the arrangement of those scopes. For instance, search preferences 128 may indicate that each scope will be on a separate tab and the order of the tabs, such as news then images then web. A variety of options for the content and arrangement of the results as well as other characteristics may be specified by search preferences 128. The service provider 102(m), and in particular the service manger module 110(m), may operate to output a user interface 116 having the search results 112(j) arranged in accordance with the customized layout specified by the search preferences 128. The user interface 116 or data may be communicated to the client 104(n) to output a corresponding user interface 116' via the communication module 118(n).

Figure 4:
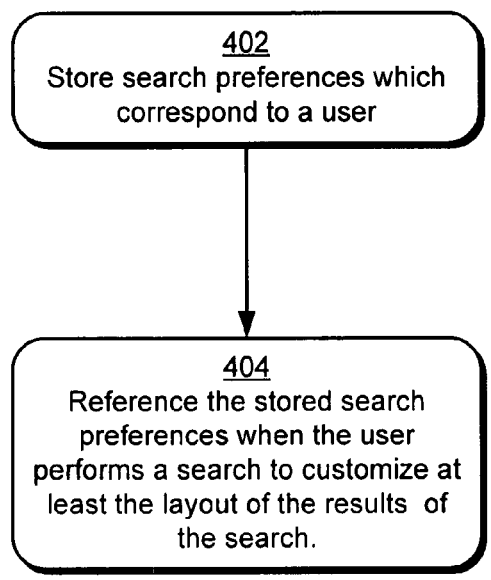
FIG. 4 is a flow diagram depicting a procedure in an exemplary implementation in which search result preferences to customize a layout for search results are stored and referenced.

FIG. 4 depicts a procedure 400 in an exemplary implementation in which search result preferences to customize a layout for search results are stored and referenced. Search preferences are stored which correspond to a user (block 402). For example, one of the clients 104(n) of FIG. 1 may execute a respective communication module 118(n) to interact with a search 108(1) service provided by one of the service providers 102(m). Through the interaction with the search 108(1) service a variety of search options 114(i) may be presented to the client 104(n). The client 104(n) may select options 114(i) which specify a customized layout of search results 112(j)

which may be provided by the search 108(1) service in response to a search by the client 104(n).

For, instance, a user interface 116' output at the client 104(n) may provide one or more portions selectable to specify various search options 114(i) including the layout 114(1) options discussed with respect to FIG. 2. The client's 104(n) selection of the one or more portions via the user interface 116' may be stored as search preferences 128 corresponding to the client 104(n) in a data store 120 which is accessible via the network 106. Additionally or alternatively, the search preferences 128 may be stored in a local data store at one or more of the clients 104(n). Search preferences 128 may be associated with a client 104(n) and/or an account 122(a) which corresponds to the client 104(n). For example, the interaction with the search service may occur via an authenticated account 122(a) which corresponds to the client 104(n). Thus, a centralized data store 120, such as at an authentication service 212 of FIG. 2, may be used to maintain a plurality of accounts 122(a) corresponding to a plurality of clients 104(n) and may store search preferences 128 for each of the accounts 122(a). In an implementation, a service manger module 110(m) of a service provider 102(m) of FIG. 2 may interact with the authentication service module 220 to cause search options 114(i) selected via an account 122(a) to be stored as search preferences 128 for the account 122(a).

Search preferences are referenced when the user performs a search to customize at least the layout of the results of the search (block 404). For instance, when a search is perform by a client 104(n) using an account 122(a), the service manger module 110(m) may reference data storage to obtain corresponding search preferences 128. Search preferences 128 may specify at least a customized layout for search results 112(j), as well as incorporating other configurable search options 114(i). The service manger module 110(m) may further cause execution of the search 108(1) service to provide search results 112(j) and to output a search result page in accordance with the corresponding search preference. For instance, a user interface 116 may be output by the service manger module 110(m) which includes the search results 112(j) and arranges the search results 112(j) according to the customized layout specified by the search preferences 128.

Figure 5:
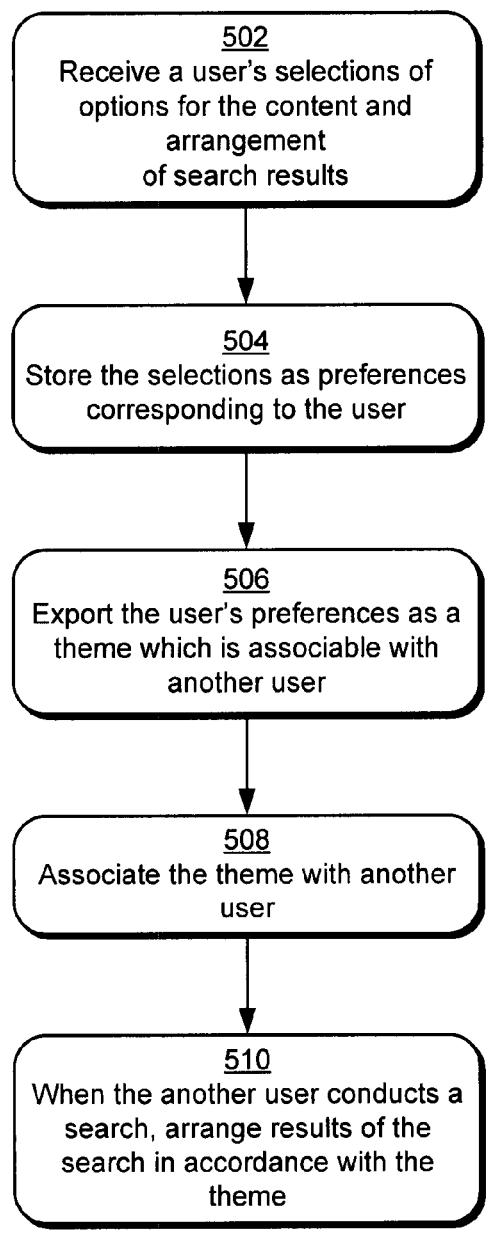
FIG. 5 is a flow diagram depicting a procedure in an exemplary implementation in which a user's selection of search result layout options are exported and associated with another user.

FIG. 5 depicts a procedure 500 in an exemplary implementation in which search result layout options of a user are exported and associated with another user. A user's selections of options for the content and arrangement of search results are received (block 502). Then, the selections are stored as preferences corresponding to the user (block 504). For example, one or more of the clients 104(n) of FIG. 1 may execute respective communication modules 118(n) to interact with one or more service providers 102(m) to permit selection of various search options 114(i) previously described. Search options 114(i) may define at least a customized layout which may include options for the content and arrangement of search results 112(j). The selected options may be stored as search preferences 128 individually at each of the clients 104(n), in a centralized data store 120 accessible via network 106, via an authentication service 212, and so forth.

The user's preferences are exported as a theme which is associable with another user (block 506). For instance, a user may export their search preferences 128 describing a customized layout of search results 112(j) for use by another user. For example, a search 108(1) service may provide functionality to export search preferences 128 associated with a user via a theme file generated in an extensible mark-up language (XML), or other mark-up language, protocol, and/or format suitable for sharing a set of user preferences. A user interface 116 output by the search 108(1) service may for example include one or more portions selectable to export defined search options 114(i) and/or stored search preferences 128 to a theme file. Additionally or alternatively, the one or more portions may be selectable to cause a theme file to be sent to another user, such as by email or other suitable communication mode, and/or to publish the theme file to a site accessible by other users to obtain or associate wit exported themes. Thus, a user may share or publish their preferences by providing the theme file to another user or uploading the theme file to a public or shared location (e.g., a theme site). For example, a first user Bob may create a theme file including a customized layout for search results 112(j) and provide the theme file to a friend Adam.

The theme is associated with another user (block 508). For instance, search 108(1) service may incorporate functionality to associate a client 104(n) and/or an account 122(a) with an exported theme file. For instance, when Adam receives the theme file provided by Bob, Adam may interact with a search 108(1) service and utilizes the theme file to automatically make corresponding search preferences 128 match those specified by Bob. Thus, search preferences 128 which may be stored in the data store 120 for Adam may be updated based on the theme file. In this way, Adam is associated with the theme file produced by Bob.

When the other user conducts a search, results of the search are arranged in accordance with the theme (block 510). For example, once Adam has selected the theme provided by Bob as his own, the results of subsequent searches performed by Adam may be arranged in accordance with the custom layout specified by theme file which Bob exported, until Adam changes his corresponding search preferences 128.

Figure 6:
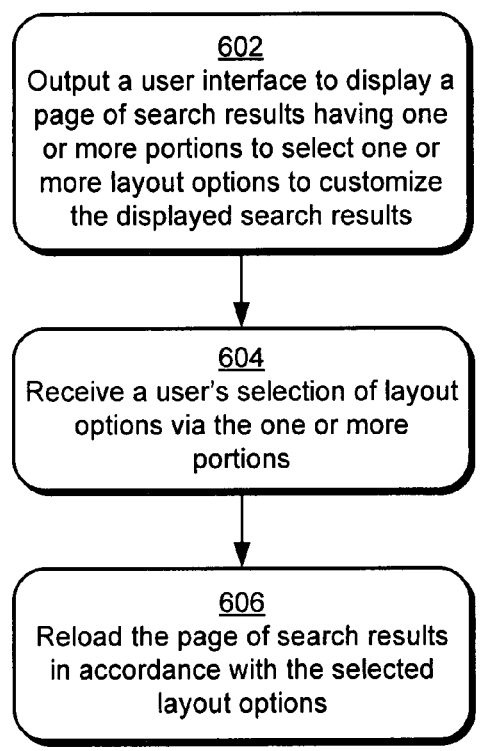
FIG. 6 is a flow diagram depicting a procedure in an exemplary implementation in which a user's selection of layout options is received via a user interface to customize search results displayed via the user interface.

FIG. 6 depicts a procedure 600 in an exemplary implementation in which a user's selection of layout options is received via a user interface to customize search results displayed via the user interface. During the discussion of the procedure 600 of FIG. 6, reference will also be made to the exemplary user interfaces shown in FIGS. 7-8.

A user interface is output to display a page of search results having one or more portions to select one or more layout options to customize the displayed search results (block 602). For instance, the exemplary user interface depicted in FIG. 7 may be output in response to a search performed by a client 104(n).

Figure 7:
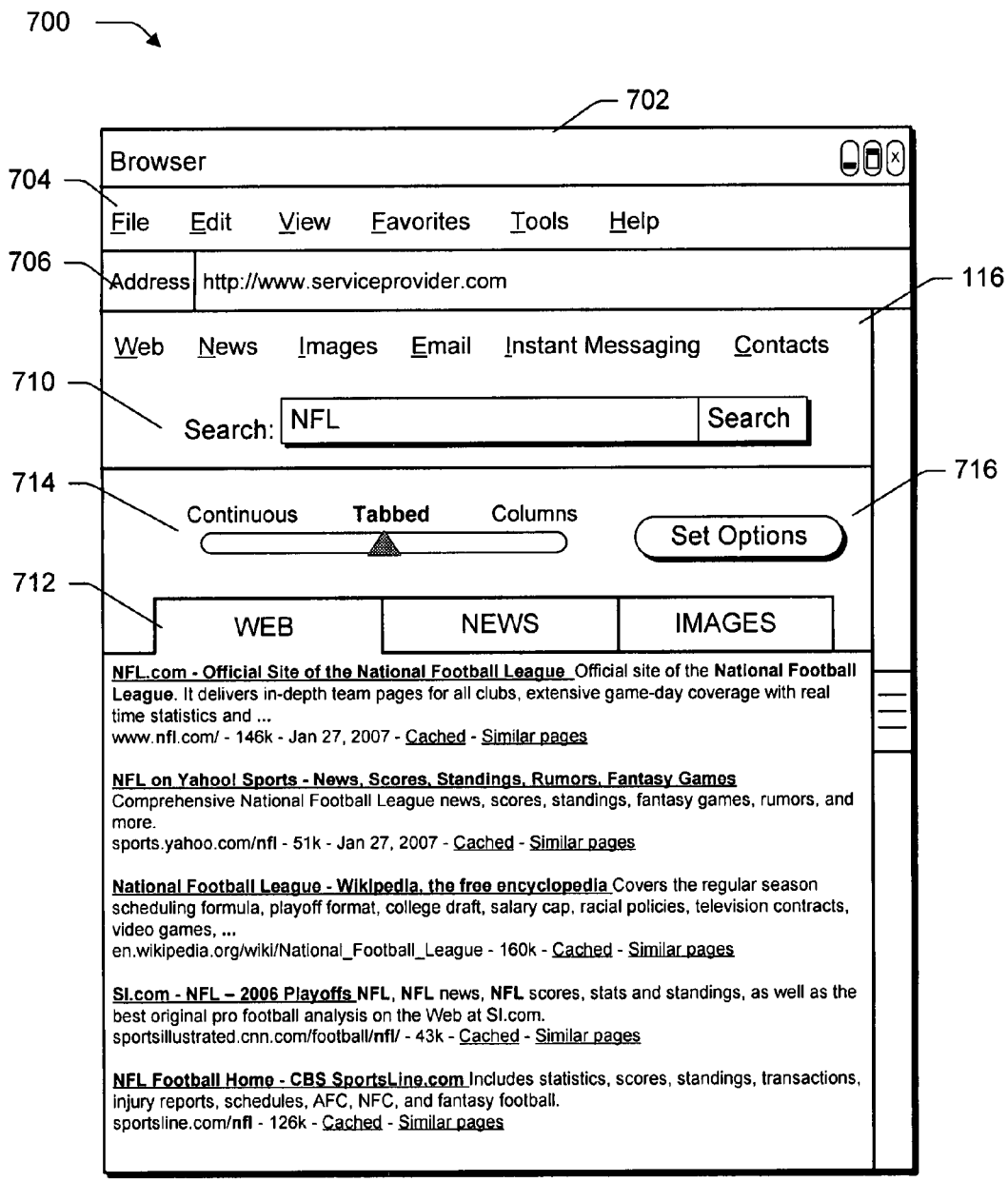
FIG. 7 illustrates an exemplary user interface having one or more portions that are selectable to specify a customized layout for search results from a search service.

Referring to FIG. 7, an exemplary implementation 700 is illustrated showing an example user interface 116 of FIG. 2 in greater detail. The user interface 116 provided by the service provider 102(m) in this instance is illustrated as incorporated within a user interface 702 provided by the communication module 118(n) of the client 104(n). For example, the communication module 118(n) may be configured as a browser that includes a menu bar 704 and an address bar 706. The menu bar 704 is a portion of the user interface 702 that includes drop-down menus of commands, examples of which are illustrated as "file", "edit", "favorites", "tools" and "help". The address bar 706 is configured to receive inputs to navigate to particular network addresses and/or display current network addresses, from which, the client 104(n) has received content and is being displayed.

The user interface 702 also includes a user interface 116 formed from data obtained via the network 106 from the service provider 102(m). The user interface 116 formed from the service provider 102(m) data includes a search scopes bar 708 that includes representations of search scopes that are available from the service provider 102(m). Examples of the search scopes are illustrated as "web" (e.g., for an Internet search), "news" (e.g., for a news search), "images" (e.g., for an image search), "email", "instant messaging", and "contacts". A variety of other scopes are also contemplated as previously described.

The user interface 116 formed from data obtained from the service provider 102(m) also includes a search portion 710 that is operable to receive characters (e.g., text) input by a user to perform a search. Items found as a result of the search may then be displayed elsewhere in the user interface 116. For instance, the illustrated user interface 116 currently provides interaction to perform a search in a plurality of search scopes for information on "The National Football League" as illustrated by the input of "NFL" in the search portion 710. Data related to the search is output in the user interface 116 in a results portion 712.

The results portion 712 as depicted in FIG. 7 may represent a default layout or may be customized according to a layout specified by search preferences 128 which may be determined by a service provider 102(m) based upon the client 104(n) (e.g., user) performing the search via a corresponding authenticated account 122(a). The exemplary results portion 712 as depicted in FIG. 7 includes search results for a plurality of scopes which in the depicted example are "web", "news" and "images". The search results in this view are arranged such that each different scope appears on a separate tab.

The user interface 116 may have one or more selectable portions to specify one or more layout 114(1) options to customize the displayed search results. Thus, the portions may be selected to change the current display and/or to specify a customize layout to be used for future searches. By way of example and not limitation, an exemplary scope display portion 714 is illustrated which may be selectable to change the way in which different search scopes are displayed. In this instance, the scope display portion 714 is configured as a slider having a slidable arrow to select a number of layout 114(1) options for different scopes. In particular the scope display portion 714 may be used to choose between "continuous" (e.g., single page), "tabbed", or "columns" for the different scopes. As noted "tabbed" is currently selected as indicated by the bold text and the position of the slidable arrow. Naturally, a plurality of selectable portions to select one or more layout 114(1) options and/or other search options 114(i) previously described may be provided. While a slider is shown, a variety of configuration of one or more selectable portions are contemplated such as list boxes, control buttons, check boxes, and other suitable controls.

Another selectable portion, in this case the set options portion 716, is also illustrated which may be selectable to access a set options page configured to set a variety of search options 114(i) including layout 114(1) options. A set options page may include a variety of controls, check boxes, buttons, and other selectable portions to specify one or more of the previously described search options 114(i). A set options page may also include functionality to save, apply and/or export selected options. Thus, search options 114(i) may be set directly via one or more selectable portions in a page to display search results 112(j) and/or via a select options page which may be accessible via the page to display search results 112(j).

Referring back to FIG. 6, a user's selection of layout options via the one or more portions is received (block 604). For example, client 104(n) may execute a communication module 118(n) to navigate to the service provider 102(m) via the network 106. The communication module 118(n) may interact with the search 108(1) service provided by the service provider 102(m) to perform a search for "NFL" as described above. The communication module 118(n) may further output the exemplary user interface 702 depicted in FIG. 7 to display search results 112(j) and which has one or more selectable portions to specify one or more layout 114(1) options to customize the displayed search results 112(j). The client 104(n) may then make selections of the one or more selectable portions via the communication module 118(n). For example, the client 104(n) may interact with the scope display portion 714 to change the display of the different scopes included in the search results 112(j). The scope display portion 714 may be changed from selecting "tabbed" as depicted in FIG. 7 to "columns". Additionally, or alternatively the client 104(n) may interact with the set options portion 716 to set one or more additional search options 114(i).

The page of search results is reloaded in accordance with the selected layout options (block 606). Thus, when the client 104(n) interacts with the scope display portion 714 output via the communication module 118(n), the results portion 712 of the user interface 116 may be reloaded to reflect the selected changes. For instance, an exemplary user interface as depicted in FIG. 8 may be output when the scope display portion 714 of FIG. 7 is changed from selecting "tabbed" to "columns".

Figure 8:
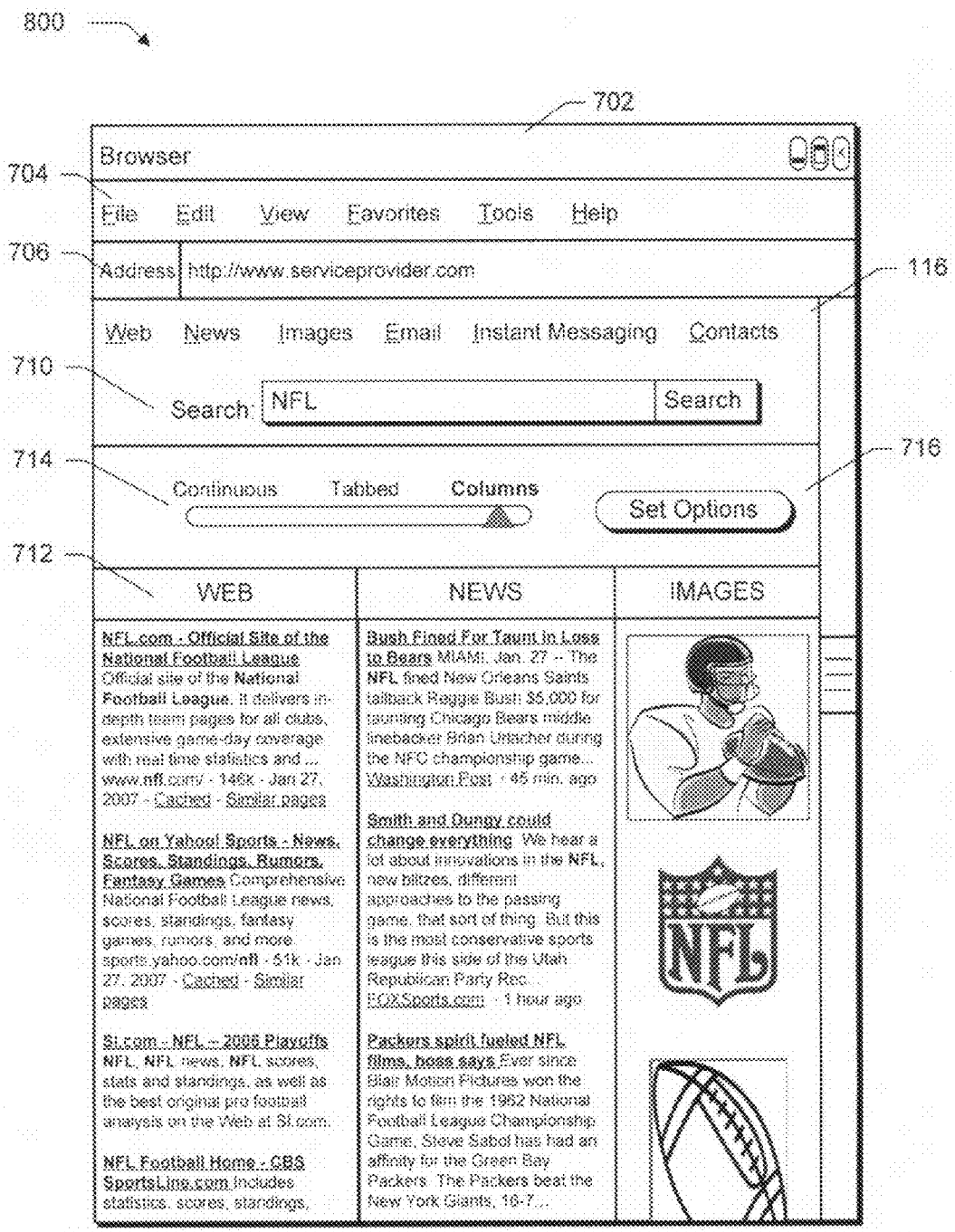
FIG. 8 illustrates an exemplary user interface as displaying search results of the user interface of FIG. 7 in accordance with customized layout options selected by a user.

Referring to FIG. 8, an exemplary implementation 800 is depicted showing the user interface of FIG. 7 following selection of one or more layout 114(1) options via one or more one or more selectable portions provided in the user interface. Continuing the preceding example, when the client 104(n) interacts with the scope display portion 714 of FIG. 7 to select "columns" the results portion 712 may be changed to the exemplary arrangement depicted in FIG. 8. As shown in FIG. 8, the different scopes web, new, and images for the search now appear in columns on a single page or tab. Further, the scope display portion 714 now shows that "columns" is selected as indicated by the bold text and the position of the slidable arrow. A variety of different changes to the layout of displayed results may similarly be made via one or more selectable portions provided in a user interface, such as the exemplary user interface 702 which may include the user interface 116. Thus the layout of displayed search results 112(j) may be changed to reflect selected layout 114(1) options and/or other search options 114(i). Naturally, layout 114(1) options and/or other search options 114(i) selected in this way may also be saved as search preferences 128 as previously described.

CONCLUSION

Although the customizable layout of search results techniques have been described in language specific to structural features and/or methodological acts, it is to be understood that the appended claims are not necessarily limited to the specific features or acts described. Rather, the specific features and acts are disclosed as exemplary forms of implementing the customizable layout of search results techniques.

What is claimed is:

1. A method comprising:
   outputting at a client a user interface having one or more portions that are user selectable to customize a layout of search results obtained from a search service, the one or more portions including a scope display control selectable to change display of the search results at the client back and forth between different views including continuous, columnar, and tabbed views of different scopes of the search results;
   when one or more of the portions are selected, customizing the layout by rearranging the obtained search results locally at the client, including customizing arrangement of the search results using a single page or a plurality of pages and arrangement of the search results using a single column or a plurality of columns in accordance with the layout specified by the user through interaction with the user interface; and storing one or more preferences that describe the layout specified by the user through interaction with the user interface.

2. A method as described in claim 1, wherein the layout specifies how at least one said search result is displayed in relation to another said search result.

3. A method as described in claim 1, wherein the layout specifies content to include in the search results and arrangement of the content in a search results page.

4. A method as described in claim 1 wherein the layout specifies arrangement of text blocks, headings, titles and graphics within the search results.

5. A method as described in claim 1 wherein the layout specifies arrangement of the search results using a single page or a plurality of pages.

6. A method as described in claim 1 wherein the layout specifies arrangement of the search results using a single column or a plurality of columns.

7. A method as described in claim 1 wherein the layout specifies:
- a plurality of search scopes to include in the search results;
- an order of the search scopes;
- arrangement of the search scopes in columns, pages or tabs; and
- for each included said search scope, a layout of corresponding said search results within a corresponding said column, page or tab.

8. A method as described in claim 7, wherein the plurality of search scopes are selected from a group consisting of:
- web;
- news;
- images;
- maps;
- contacts;
- email;
- instant messaging;
- classifieds;
- client desktop; and
- a user defined search scope.

9. A method as described in claim 1, wherein the layout describes:
- one or more portions to include with each said search result, the portions selected from a group consisting of:
  - title of the result;
  - snippet;
  - uniform resource locator;
  - source of the result;
  - date; and
  - size of the result;
- the arrangement of the included portions; and
- for each included portion, one or more text properties for the portion selected from a group consisting of: font; size of the text; hyperlinked or plain; and color.

10. A method as described in claim 1 further comprising:
associating the preferences with a user account; and
when a search is performed via a client authenticated to the user account; referencing the associated preferences to arrange a resultant page of search results in accordance with the preferences.

11. A method as described in claim 10 further comprising:
exporting the preferences associated with the user account; and
associating the exported preferences with another user account such that when a search is performed via a client authenticated to the other user account, a corresponding page of search results is arranged in accordance with the exported preferences.

12. A method as described in claim 1, wherein the search service is an Internet search service.

13. A method comprising:
arranging search results obtained from an Internet search service according to a customized layout described by one or more preferences specified by a user, the customized layout configured to describe one or more portions to include in each search result and arrangement of the one or more portions one to another within each search result; and
outputting the arranged search results according to the customized layout via a user interface having one or more controls selectable to further customize the arranged search results including at least rearranging the one or more portions in the user interface one to another and changing display of the search results at the client back and forth between different views including continuous, columnar, and tabbed views of different scopes of the search results, the customized layout configured to specify:
- a plurality of search scopes to include in the search results; and
- arrangement of the included search scopes in the search results, the arrangement including:
  - an order of the search scopes;
  - arrangement of the search scopes in columns, pages or tabs;
  - arrangement of the search scopes in a single column or a plurality of columns;
  - arrangement of the search scopes using a single page or in a plurality of pages;
  - arrangement of the search scopes using a single tab or a plurality of tabs; and
  - for each included search scope, a layout of corresponding said search results within a corresponding said column, page, or tab.

14. A method as described in claim 13, wherein the arranging and the outputting are performed by a client that initiated a search request that resulted in the search results.

15. A method as described in claim 13, wherein the one or more portions are selected from a group consisting of:
- title of the result;
- snippet;
- uniform resource locator;
- source of the result;
- date; and
- size of the result.

16. One or more computer readable media comprising instructions that are executable to:
expose a user interface having a page of search results and one or more selectable portions to select options for content and arrangement of the page of search results, the one or more selectable portions including a slider control selectable to change display of search results at the client back and forth between different views including continuous, columnar, and tabbed views of different scopes of the search results, the page of search results obtained from an Internet search service in response to a search initiated by the user;
determine based upon the user's selection of the one or more portions preferences corresponding to the user which describe user selected options for content and arrangement of the page of search results, the options for content and arrangement describing at least a plurality of search scopes for the search and arrangement of the plurality of search scopes in a single column, in multiple columns, or on separate tabs;

output the page of search results according to the determined preferences; and enable modification to dynamically rearrange the options for content and arrangement of the page of search results at the client including movement of one or more content portions of the page of search results to different locations.

17. One or more computer readable media as described in claim 16, wherein the instructions are executable to determine preferences corresponding to the user by referencing stored preferences which are associated with an authenticated user account used by the user to initiate the search.

18. One or more computer readable media as described in claim 16, wherein the user selected options for content and arrangement further include one or more customized options selected from a group consisting of:

a custom image;
a background image;
a background color;
a custom selectable portion;
a image property;
a text property;
a line property; and
a color selection.

* * * * *